US008914068B2

(12) United States Patent
Hayashi et al.

(10) Patent No.: US 8,914,068 B2
(45) Date of Patent: Dec. 16, 2014

(54) ARRAY ANTENNA APPARATUS

(75) Inventors: Ryoji Hayashi, Tokyo (JP); Yoshihito Hirano, Tokyo (JP); Kiyohide Sakai, Tokyo (JP); Mitsuhiro Shimozawa, Tokyo (JP); Akira Inoue, Tokyo (JP); Morishige Hieda, Tokyo (JP); Hiroyuki Joba, Tokyo (JP); Kenichi Tajima, Tokyo (JP); Yoshinori Takahashi, Tokyo (JP); Kazutomi Mori, Tokyo (JP); Tomohiro Akiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 310 days.

(21) Appl. No.: 13/581,507

(22) PCT Filed: Feb. 22, 2011

(86) PCT No.: PCT/JP2011/053811
§ 371 (c)(1),
(2), (4) Date: Aug. 28, 2012

(87) PCT Pub. No.: WO2011/108397
PCT Pub. Date: Sep. 9, 2011

(65) Prior Publication Data
US 2012/0319746 A1 Dec. 20, 2012

(30) Foreign Application Priority Data
Mar. 4, 2010 (JP) .................................. 2010-047945

(51) Int. Cl.
*H04M 1/00* (2006.01)
*H01Q 3/42* (2006.01)

(52) U.S. Cl.
CPC ............. *H01Q 3/42* (2013.01); *H04B 17/0085* (2013.01); *H01Q 3/30* (2013.01); *H01Q 21/0025* (2013.01)
USPC ............ 455/562.1; 455/76; 455/84; 455/103; 455/118

(58) Field of Classification Search
CPC ......... H03L 7/099; H03L 7/18; H03L 7/0812; H03L 7/0891; H03L 7/10; H03L 7/1976; H03L 2207/06; H03L 7/16; H03L 7/23; H03L 7/07; H03L 7/0996
USPC ...................................................... 455/562.1
See application file for complete search history.

(56) References Cited

U.S. PATENT DOCUMENTS

| 5,061,937 A | 10/1991 | Ozeki et al. |
| 6,054,948 A | 4/2000 | Dean |

(Continued)

FOREIGN PATENT DOCUMENTS

| EP | 0 359 238 A2 | 3/1990 | |
| EP | 359238 A2 * | 3/1990 | ............. H01Q 21/00 |

(Continued)

OTHER PUBLICATIONS

Extended European Search Report issued Apr. 8, 2014 in Patent Application No. 11750509.9.

(Continued)

*Primary Examiner* — Ajibola Akinyemi
(74) *Attorney, Agent, or Firm* — Oblon, Spivak, McClelland, Maier & Neustadt, L.L.P.

(57) ABSTRACT

An array antenna apparatus in which an SN ratio is improved. Antenna elements having transmission modules, respectively, are arranged in plurality, wherein the plurality of transmission modules respectively have transmission signal generators that each output a transmission intermediate frequency signal, local oscillation signal generators that each output a local oscillation signal, and transmission mixers that each mix the transmission intermediate frequency signal and the local oscillation signal with each other, thereby to carry out frequency conversion to a transmission high frequency signal. A reference signal source inputs a reference signal to the transmission signal generators and the local oscillation signal generators. The transmission intermediate frequency signal and the local oscillation signal are synchronized with each other by the reference signal.

13 Claims, 7 Drawing Sheets

(51) Int. Cl.
  *H04B 17/00* (2006.01)
  *H01Q 3/30* (2006.01)
  *H01Q 21/00* (2006.01)

(56) References Cited

U.S. PATENT DOCUMENTS

| | | |
|---|---|---|
| 2001/0046844 A1 | 11/2001 | Oura |
| 2007/0002846 A1 | 1/2007 | Rada et al. |
| 2008/0024145 A1* | 1/2008 | Schultheiss et al. .......... 324/644 |

FOREIGN PATENT DOCUMENTS

| | | |
|---|---|---|
| GB | 1 365 027 | 8/1974 |
| JP | 2 95002 | 4/1990 |
| JP | 2 193088 | 7/1990 |
| JP | 11 266112 | 9/1999 |
| JP | 2001 502152 | 2/2001 |
| JP | 2001 326583 | 11/2001 |
| WO | WO 2007/085941 A1 | 8/2007 |

OTHER PUBLICATIONS

Tavik, G., et al., "The Advanced Multifunction RF Concept," IEEE Transactions on Microwave Theory and Techniques, vol. 53, No. 3, pp. 1009 to 1020, (Mar. 2005).
International Search Report Issued May 31, 2011 in PCT/JP11/53811 Filed Feb. 22, 2011.

* cited by examiner

ARRAY ANTENNA APPARATUS

TECHNICAL FIELD

The present invention relates to an array antenna apparatus which is constructed by arranging a plurality of antenna systems.

BACKGROUND ART

In the past, there have been proposed a variety of kinds of constructions in array antennas apparatuses (for example, refer to a first patent document and a first nonpatent document).

A conventional array antenna apparatus as shown in the first patent document is provided with a plurality of antenna elements, a plurality of transmission and reception modules that are connected to the individual antenna elements, respectively, and a distributing and synthesizing device that distributes transmission intermediate frequency signals to the plurality of transmission and reception modules (or synthesizes reception intermediate frequency signals from the plurality of transmission and reception modules).

In addition, each transmission and reception module is provided with a first duplexer that sends a transmission high frequency signal to each antenna element (or receives a reception high frequency signal from the antenna element), a transmission amplifier that amplifies the transmission high frequency signal and sends it to the duplexer, a reception amplifier that amplifies a reception high frequency signal from the duplexer, a second duplexer that sends the transmission high frequency signal to the transmission amplifier (or receives the reception high frequency signal from the reception amplifier), a mixer that is combined with the second duplexer and produces the transmission high frequency signal from a local oscillation signal and an intermediate frequency signal from the outside (or produces a reception intermediate frequency signal from the local oscillation signal and the reception high frequency signal), and a local oscillation signal generator.

In the above-mentioned construction of the first patent document, a clock signal and a trigger signal are inputted to the local oscillation signal generator from the outside, so that the synchronization of local oscillation signals generated by the individual transmission and reception modules is taken therein.

In this manner, transmission loss at the time of distributing and combining or synthesizing signals or supplying electric power to the modules is suppressed by using intermediate frequency signals instead of high frequency signals as the transmission and reception signals which are inputted to or outputted from the transmission and reception modules of the array antenna apparatus.

On the other hand, in the case of another conventional array antenna apparatus as shown in the first nonpatent document, in a transmission array, antenna elements are grouped into a plurality of groups, each of which comprises a plurality of antenna elements arranged in proximity with one another, and the antenna elements of each group are connected to one another through a signal distributor which is composed of a plurality of transmission signal generators and a cross point switch.

In the above-mentioned construction in the first patent document, it is constructed such that the transmission high frequency signals generated by the transmission signal generators are distributed to supply electric power to the antenna elements of arbitrary groups, wherein by dividing an aperture plane of a transmission array antenna, the thus divided parts thereof are assigned to a plurality of communications, electronic warfare systems, radars, etc., respectively, so that they can be used at the same time.

PRIOR ART REFERENCES

Patent Documents

[First Patent Document] Japanese patent application laid-open No. H11-266112

Nonpatent Documents

[First Nonpatent Document] "The Advanced Multifunction RF Concept", G. C. Tavik, et al., IEEE Transactions on Microwave Theory and Techniques, Vol. 53, No. 3, March 2005

SUMMARY OF THE INVENTION

Problems to be Solved by the Invention

Among the conventional array antenna apparatuses, the apparatus described in the first patent document has had the following problem. That is, the same transmission intermediate frequency signal has been distributed to transmission and reception modules of a plurality of antenna elements, so it is impossible to perform aperture division in which different transmission signals are transmitted to the individual antenna elements thus grouped, respectively, so that one and the same array antenna apparatus can be used as a plurality of communication systems, electronic warfare systems, radars, and so on at the same time.

In addition, in the apparatus described in the above-mentioned first nonpatent document, there has been a problem that the transmission signals generated by the transmission signal generators are high frequency signals, and hence, transmission loss is large due to the distribution of the transmission high frequency signals to the antenna elements.

The present invention has been made in order to solve the problems as referred to above, and has for its object to obtain an array antenna apparatus in which an SN ratio is improved.

Means for Solving the Problems

An array antenna apparatus according to the present invention is constructed such that a plurality of antenna elements having transmission modules, respectively, are arranged, and each of the plurality of transmission modules includes a transmission signal generator that outputs a transmission intermediate frequency signal, a local oscillation signal generator that outputs a local oscillation signal, and a transmission mixer that mixes the transmission intermediate frequency signal and the local oscillation signal with each other thereby to carry out frequency conversion to a transmission high frequency signal, wherein a reference signal source is provided which inputs a reference signal to the transmission signal generator and the local oscillation signal generator, and the transmission intermediate frequency signal and the local oscillation signal are synchronized with each other by the reference signal.

Effect of the Invention

According to the present invention, by combining the transmission high frequency signals generated from a plurality of (n) local oscillation signals with one another, it is possible to improve an SN ratio by n times in comparison with the case where a transmission high frequency signal generated from a single local oscillation signal is amplified by n times.

MODES FOR CARRYING OUT THE INVENTION

First Embodiment

Figure 1:
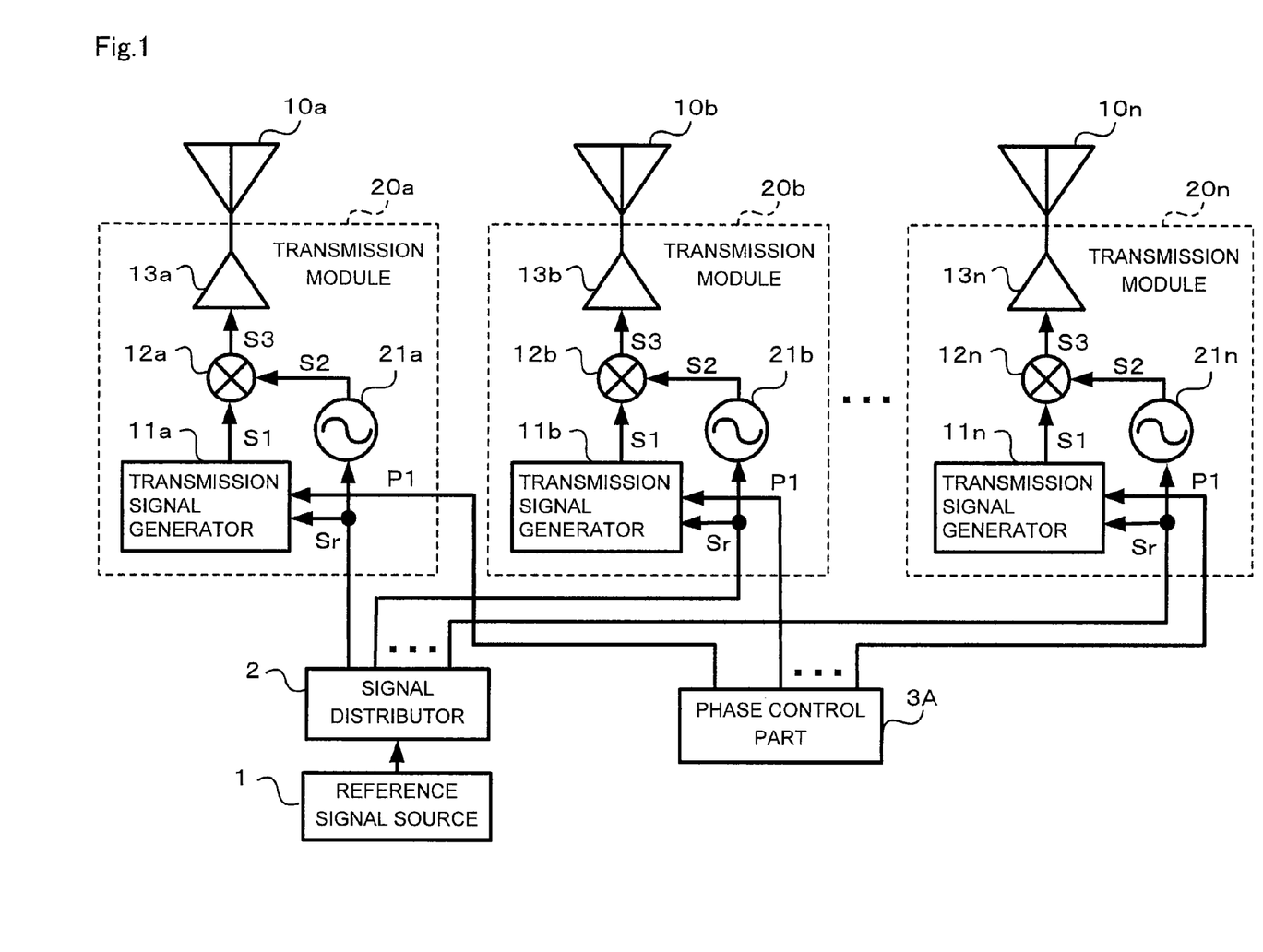
FIG. 1 is a block diagram showing a first construction example of an array antenna apparatus according to a first embodiment of the present invention. (First Embodiment)
Figure 2:
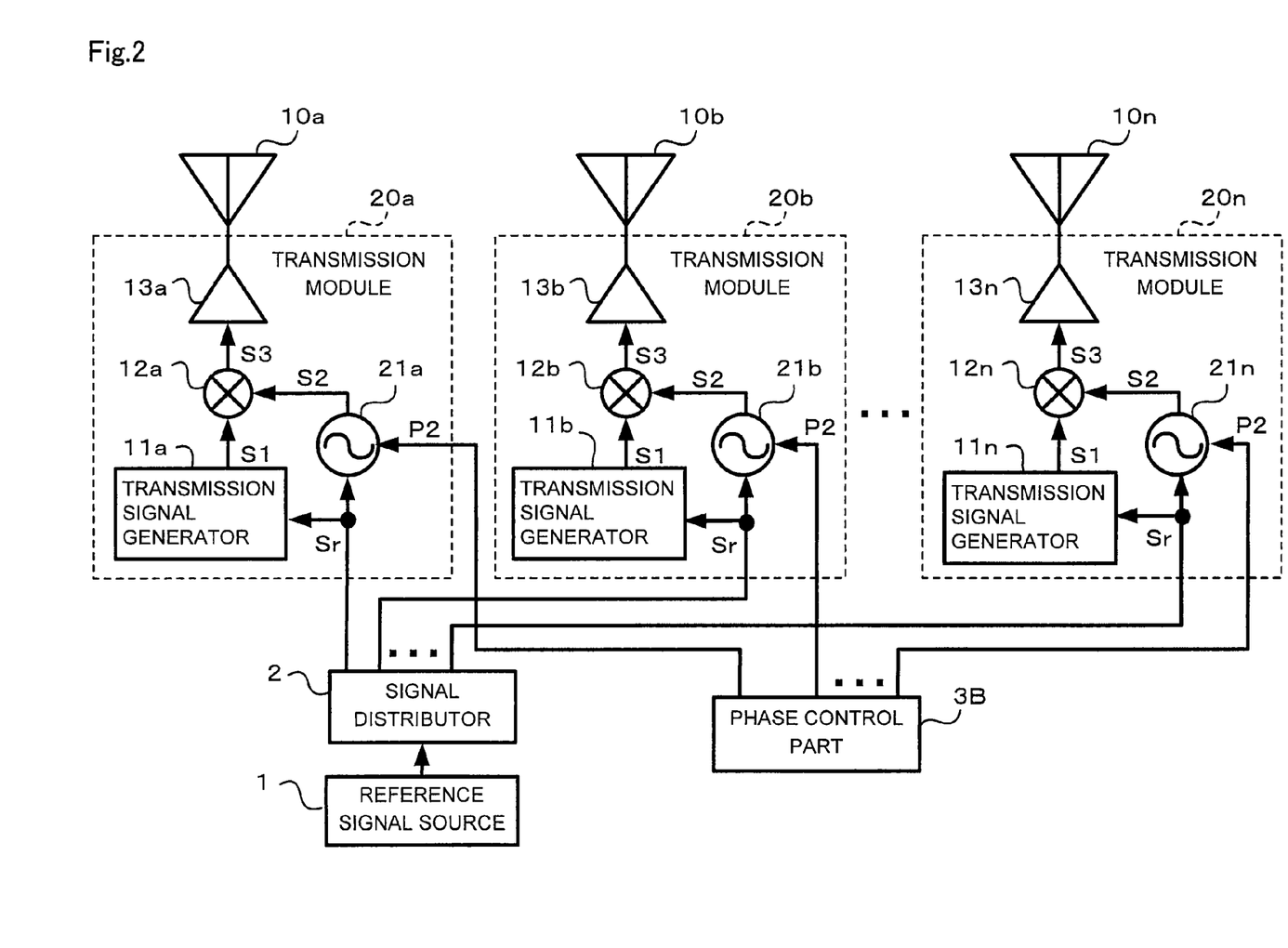
FIG. 2 is a block diagram showing a second construction example of an array antenna apparatus according to the first embodiment of the present invention. (First Embodiment)

FIG. 1 and FIG. 2 are block diagrams showing an array antenna apparatus according to a first embodiment of the present invention, and these figures show different construction examples, respectively.

Here, only transmission modules $20a$-$20n$ of a plurality of (n) antenna elements $10a$-$10n$ are shown, but it is assumed that each of the antenna elements $10a$-$10n$ is also provided with a reception module (to be described later together with FIG. 5 and FIG. 6), and that each of the antenna elements $10a$-$10n$ is composed of a transmission and reception antenna.

In FIG. 1 and FIG. 2, the array antenna apparatus is constructed such that n (n being an arbitrary natural number more than "1") antenna elements $10a$-$10n$ having individual transmission modules $20a$-$20n$, respectively, are arranged in plurality.

Because the transmission modules $20a$-$20n$ are each constructed by the same circuit arrangement, the individual circuit elements within the transmission modules $20a$-$20n$ are denoted by the same symbols with "a, b, . . . , n" being affixed thereafter, respectively.

Typically, focusing on the antenna element $10a$ at the left-hand end in FIG. 1, the transmission module $20a$ is provided with a transmission signal generator $11a$ that outputs a transmission intermediate frequency signal S1, a local oscillation signal generator $21a$ that outputs a local oscillation signal S2, a transmission mixer $12a$ that mixes the transmission intermediate frequency signal S1 and the local oscillation signal S2 with each other thereby to carry out frequency conversion to a transmission high frequency signal S3, and a transmission power amplifier $13a$ that amplifies the transmission high frequency signal S3.

A reference signal source 1 is connected to the individual transmission modules $20a$-$20n$, respectively, through a signal distributor 2, wherein the reference signal source 1 generates a reference signal Sr, and inputs the reference signal Sr to the transmission signal generators $11a$-$11n$ and the local oscillation signal generators $21a$-$21n$ within the individual transmission modules $20a$-$20n$ through the signal distributor 2.

As a result of this, the transmission intermediate frequency signal S1 outputted from each of the transmission signal generators $11a$-$11n$ and the local oscillation signal S2 outputted from each of the local oscillation signal generators $21a$-$21n$ are made to synchronize by means of the reference signal Sr.

The individual antenna elements $10a$-$10n$ transmit the transmission high frequency signals S3 amplified by the transmission power amplifiers $13a$-$13n$ as electric waves, respectively.

Here, note that an arbitrary element can be applied to the local oscillation signal generator $21a$ as long as it generates a local oscillation signal S2 in synchronization with a reference signal Sr, and it may be composed of an injection locked oscillator, or may be composed of a phase locked loop (PLL).

In addition, in FIG. 1, a phase control part 3A is connected to the individual transmission signal generators $11a$-$11n$ within the transmission modules $20a$-$20n$, respectively, wherein the phase control part 3A inputs phase control signals P1 to the transmission signal generators $11a$-$11n$, respectively, so that it controls the phases of the transmission intermediate frequency signals S1 from the transmission signal generators $11a$-$11n$, respectively.

On the other hand, in FIG. 2, a phase control part 3B is connected to the individual local oscillation signal generators $21a$-$21n$ within the transmission modules $20a$-$20n$, respectively, wherein the phase control part 3B inputs phase control signals P2 to the local oscillation signal generators $21a$-$21n$, so that it controls the phases of the local oscillation signals S2 from the local oscillation signal generators $21a$-$21n$, respectively.

In any of the cases of FIG. 1 and FIG. 2, too, the phases of the transmission high frequency signals S3 outputted from the transmission power amplifiers $13a$-$13n$ are controlled under the control of the phase control parts 3A, 3B, and hence, it becomes possible to control the shapes and directions of the transmission beams from the antenna elements $10a$-$10n$.

In FIG. 1, in order to control the phases of the transmission intermediate frequency signals S1 from the transmission signal generators $11a$-$11n$ by means of the phase control signals P1, respectively, for example, the transmission signal generators $11a$-$11n$ may be composed of direct digital synthesizers, respectively, wherein the phases of the output signals of the direct digital synthesizers are controlled.

Alternatively, phase shifters (not shown) may be arranged at output parts of the transmission signal generators $11a$-$11n$, respectively, so that the phase shifters are controlled.

In addition, in FIG. 2, in order to control the phases of the local oscillation signals S2 from the local oscillation signal generators $21a$-$21n$ by means of the phase control signals P2, respectively, for example, phase shifters (not shown) may be arranged at output parts of the local oscillation signal generators $21a$-$21n$, respectively, so that the phase shifters are controlled to directly control the local oscillation signals S2, respectively.

Alternatively, phase shifters (not shown) may be arranged at input parts of the local oscillation signal generators $21a$-$21n$, respectively, to which the reference signals Sr are inputted, so that the phase shifters are controlled to control the reference signals Sr, respectively.

Next, reference will be made to an operation of the array antenna apparatus according to the first embodiment of the present invention, while referring to FIG. 1 and FIG. 2.

In the transmission modules 20a-20n, the transmission mixers 12a-12n respectively mix the transmission intermediate frequency signals S1 outputted from the transmission signal generators 11a-11n, respectively, and the local oscillation signals S2 outputted from the local oscillation signal generators 21a-21n, respectively, so that they generate the transmission high frequency signals S3, respectively, by means of frequency conversion.

The transmission high frequency signals S3 are amplified by the transmission power amplifiers 13a-13n, respectively, and thereafter are transmitted from the antenna elements 10a-10n, respectively.

At this time, the transmission intermediate frequency signals S1 and the local oscillation signals S2 are synchronized with the reference signal Sr which is distributed and inputted through the signal distributor 2, as mentioned above, so that the transmission high frequency signals S3 are also synchronized with the reference signal Sr.

Accordingly, by controlling the phases of the transmission high frequency signals S3 by means of the phase control signals P1 of the phase control part 3A or the phase control signals P2 of the phase control part 3B, it becomes possible to control the shapes and directions of transmission beams to be transmitted from the individual antenna elements 10a-10n, respectively.

In addition, the local oscillation signal generators 21a-21n are independently arranged for the antenna elements 10a-10n, respectively, and hence, the fluctuations (phase noise) in the frequencies of the local oscillation signals S2 are also independent from one another.

Accordingly, when the phases of the transmission high frequency signals S3 are controlled to form the transmission beams through vector synthesis of the signals, respectively, the signals are subjected to amplitude synthesis or combination, but on the other hand, the phase noises contained in the transmission high frequency signals S3 are subjected to electric power synthesis or combination.

In other words, by combining or synthesizing the transmission high frequency signals S3 generated from the n local oscillation signals S2 with one another, it is possible to improve an SN ratio by n times in comparison with the case where a transmission high frequency signal generated from a single local oscillation signal is amplified by n times.

As described above, the array antenna apparatus according to the first embodiment (FIG. 1 and FIG. 2) of the present invention is constructed such that the plurality of (n) antenna elements 10a-10n having the transmission modules 20a-20n, respectively, are arranged.

The plurality of transmission modules 20a-20n respectively have, as individual elements, the transmission signal generators 11a-11n that each output a transmission intermediate frequency signal S1, the local oscillation signal generators 21a-21n that each output a local oscillation signal S2, and the transmission mixers 12a-12n that each mix the transmission intermediate frequency signal S1 and the local oscillation signal S2 with each other, thereby to carry out frequency conversion to a transmission high frequency signal S3.

In addition, the array antenna apparatus according to the first embodiment of the present invention is provided with the reference signal source 1 that inputs a reference signal Sr to the transmission signal generators 11a-11n and the local oscillation signal generators 21a-21n, respectively, wherein the transmission intermediate frequency signals S1 and the local oscillation signals S2 are synchronized with each other by the reference signal Sr.

Moreover, in the construction example in FIG. 1, the phase control part 3A is provided which outputs phase control signals P1 to the transmission signal generators 11a-11n, respectively, wherein the phases of the transmission intermediate frequency signals S1 are controlled by the phase control signals P1, respectively.

On the other hand, in the construction example in FIG. 2, the phase control part 3B is provided which outputs phase control signals P2 to the local oscillation signal generators 21a-21n, respectively, wherein the phases of the local oscillation signals S2 are controlled by the phase control signals P1, respectively.

In any of the construction examples in FIG. 1 and FIG. 2, too, by combining the transmission high frequency signals S3 generated based on the plurality of (n) local oscillation signal generators 21a-21n with one another, it is possible to improve the SN ratio by n times in comparison with the case where a transmission high frequency signal generated from a single local oscillation signal is amplified by n times.

Second Embodiment

Figure 3:
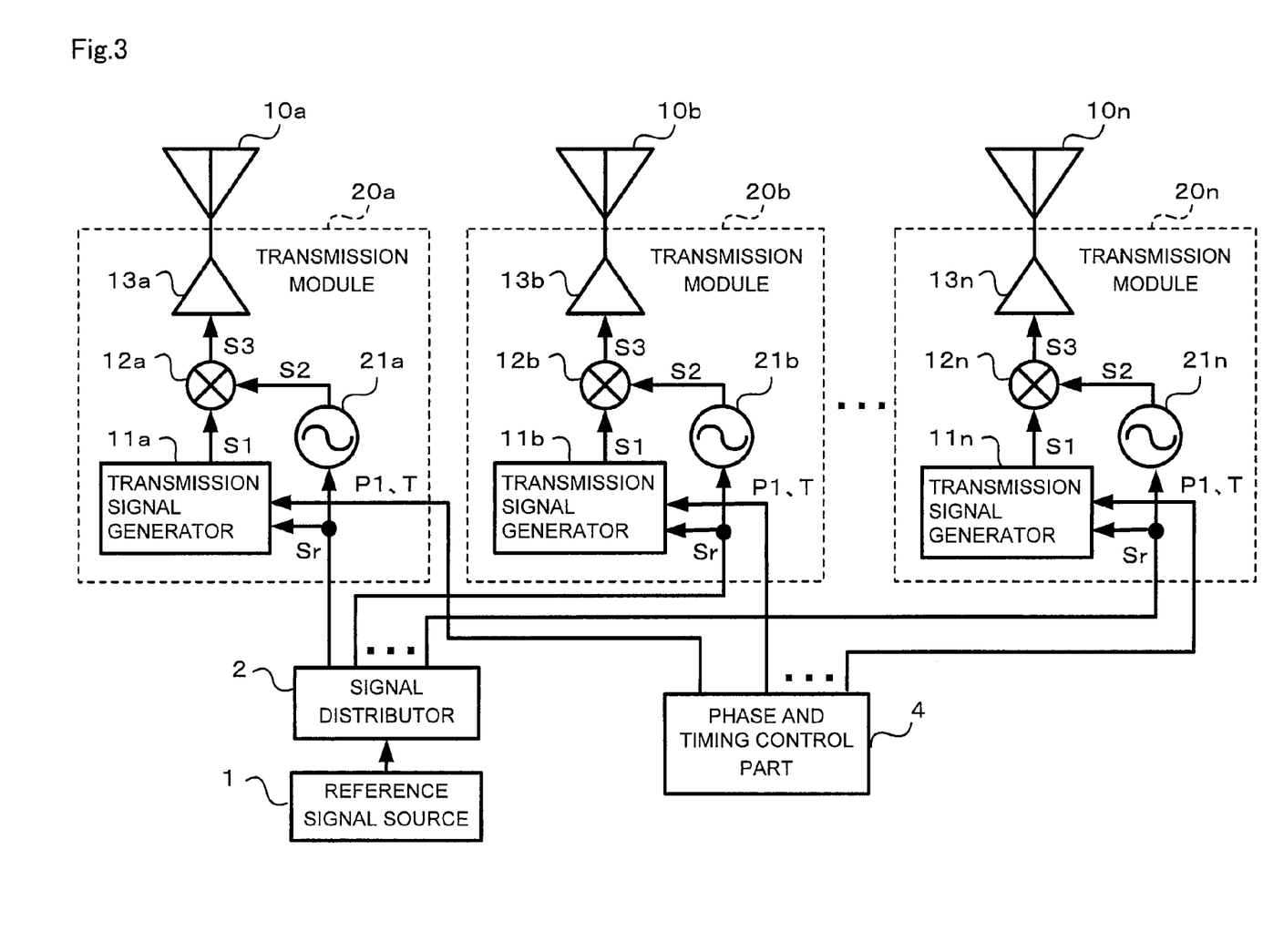
FIG. 3 is a block diagram showing a first construction example of an array antenna apparatus according to a second embodiment of the present invention. (Second Embodiment)
Figure 4:
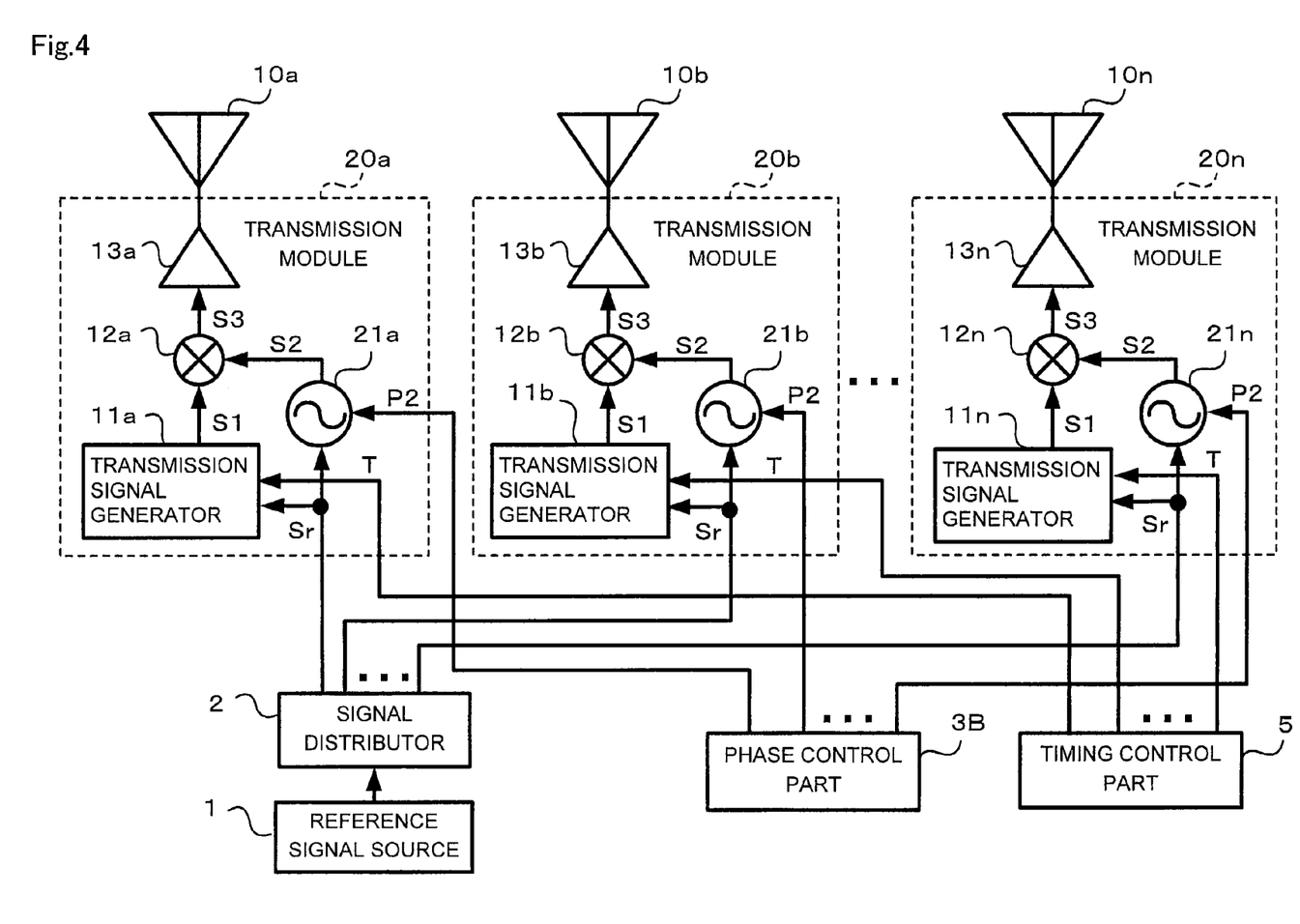
FIG. 4 is a block diagram showing a second construction example of an array antenna apparatus according to the second embodiment of the present invention. (Second Embodiment)

Here, note that in the above-mentioned first embodiment (FIG. 1 and FIG. 2), only the phases of the transmission signal generators 11a-11n or the phases of the local oscillation signal generators 21a-21n have been controlled, but the timings of the transmission signal generators 11a-11n may be controlled, as shown in FIG. 3 or FIG. 4.

FIG. 3 and FIG. 4 are block diagrams showing construction examples of an array antenna apparatus according to a second embodiment of the present invention, wherein similarly as stated above, these figures show only transmission modules 20a-20n, but the different construction examples, respectively.

In FIG. 3 and FIG. 4, those which are similar to the aforementioned ones (see FIG. 1 and FIG. 2) are denoted by the same reference numerals and characters as those in the aforementioned ones, while omitting a detailed explanation thereof.

In FIG. 3, it is different from FIG. 1 only in that a phase and timing control part 4 is provided in place of the phase control part 3A in FIG. 1.

In FIG. 3, the phase and timing control part 4 inputs not only phase control signals P1 but also timing control signals T to the transmission signal generators 11a-11n, so that it controls the phases and signal generation timings of transmission intermediate frequency signals S1 outputted by the transmission signal generators 11a-11n, respectively.

On the other hand, in FIG. 4, it is different from FIG. 2 only in that a timing control part 5 is provided, in addition to the construction in FIG. 2.

In FIG. 4, the timing control part 5 inputs timing control signals T to the transmission signal generators 11a-11n, respectively, so that it controls the signal generation timings of transmission intermediate frequency signals S1 outputted from the transmission signal generators 11a-11n, respectively. In addition, similarly as stated above, the phase control part 3B inputs phase control signals P2 to the local oscillation signal generators 21a-21n, respectively, so that it controls the phases of the local oscillation signals S2 generated by the local oscillation signal generators 21a-21n, respectively.

As described above, the array antenna apparatus according to the second embodiment (FIG. 3 and FIG. 4) of the present invention is provided, in the construction example of FIG. 3, with the phase and timing control part 4 that outputs the phase control signals P1 and the timing control signals T to the transmission signal generators 11a-11n, respectively, so that the phases of the transmission intermediate frequency signals S1 are controlled, and at the same time, the signal generation timings of the transmission intermediate frequency signals S1 are controlled by the timing control signals T, respectively.

In addition, in the construction example in FIG. 4, the timing control part 5 is provided which outputs timing control signals T to the transmission signal generators 11a-11n, respectively, wherein the signal generation timings of the transmission intermediate frequency signals S1 are controlled by the timing control signals T, respectively.

As a result of this, in any of the cases of FIG. 3 and FIG. 4, too, the phases and signal generation timings of transmission high frequency signals S3 outputted from the transmission mixers 12a-12n, respectively, are controlled, and hence, even if the antenna elements 10a-10n are arranged in a discretely distributed manner (i.e., in cases where the distances from the individual antenna elements 10a-10n to a target are different from one another), the timings of the transmission high frequency signals S3 outputted from the antenna elements 10a-10n, respectively, can be controlled in such a manner that the timings of the electric waves (the transmission high frequency signals S3) at which they arrives at the target from the individual antenna elements 10a-10n are in match or coincidence with one another.

Moreover, in FIG. 3, the phase control signals P1 and the timing control signals T from the phase and timing control part 4 can be outputted in parallel form or in serial form.

For example, in cases where the phase control signals P1 and the timing control signals T are outputted in serial form, it is possible to reduce the number of wirings to be distributed to the individual local oscillation signal generators 21a-21n (individual transmission and reception modules).

Third Embodiment

Figure 5:
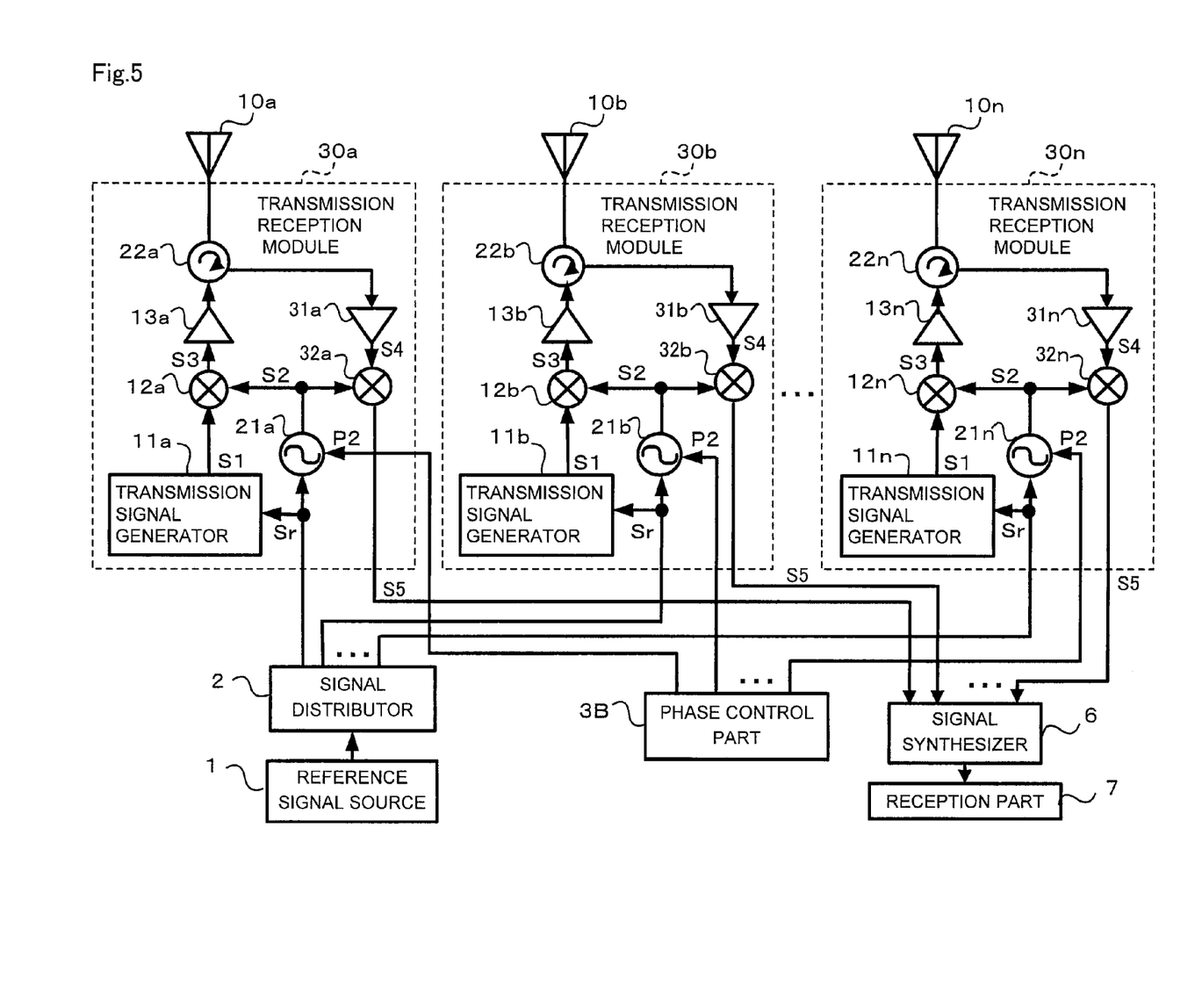
FIG. 5 is a block diagram showing a first construction example of an array antenna apparatus according to a third embodiment of the present invention. (Third Embodiment)
Figure 6:
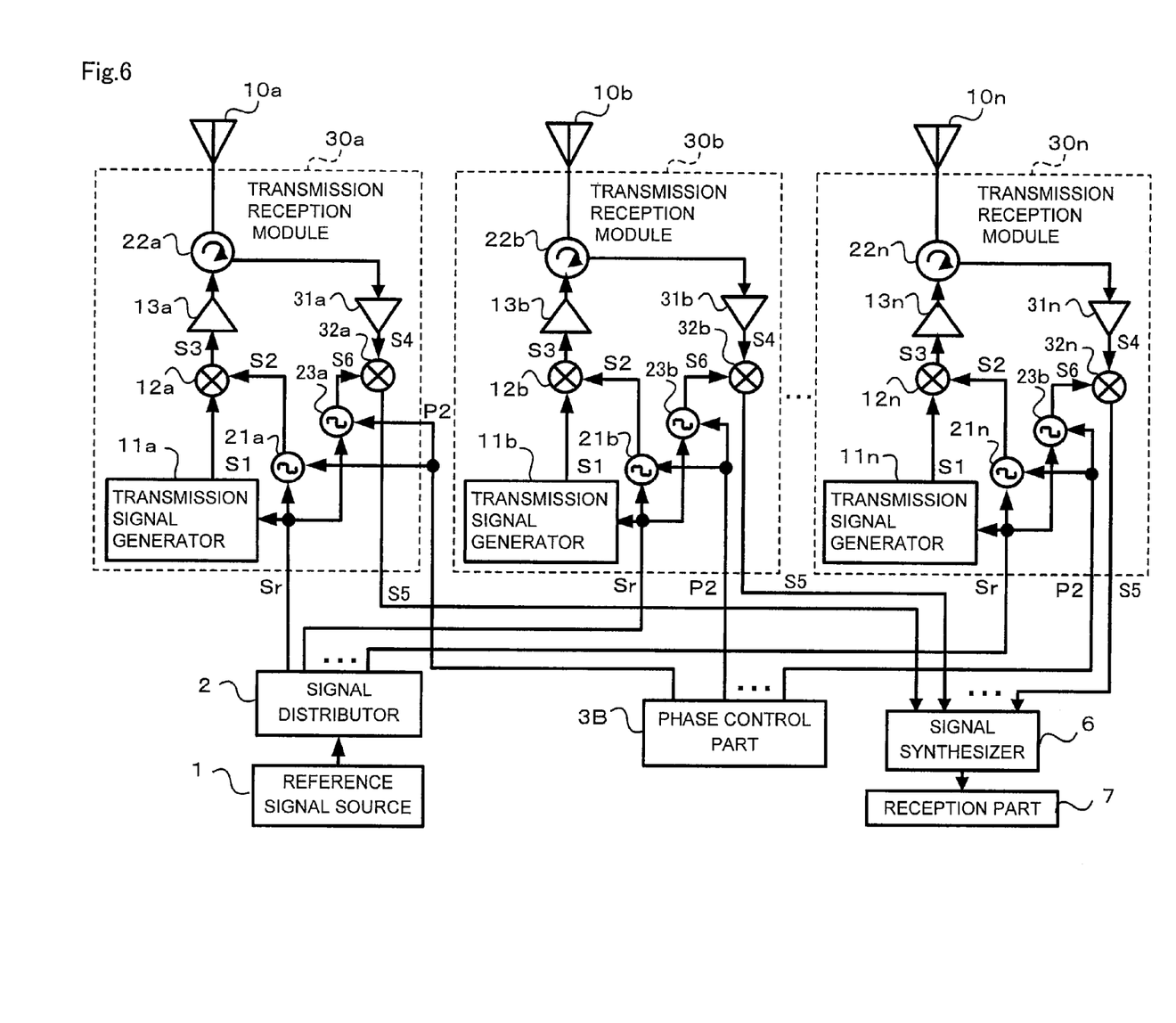
FIG. 6 is a block diagram showing a second construction example of an array antenna apparatus according to a third embodiment of the present invention. (Third Embodiment)

Here, note that in the above-mentioned first and second embodiments (FIG. 1 through FIG. 4), there has been shown the case where the invention is applied only to the transmission modules 20a-20n, but it may also be applied to transmission and reception modules 30a-30n (transmission modules and reception modules), as shown in FIG. 5 or FIG. 6.

FIG. 5 and FIG. 6 are block diagrams showing an array antenna apparatus according to a third embodiment of the present invention, and these figures show different construction examples, respectively.

In FIG. 5 and FIG. 6, those which are similar to the aforementioned ones (see FIG. 1 through FIG. 4) are denoted by the same reference numerals and characters as those in the aforementioned ones, while omitting a detailed explanation thereof.

In FIG. 5, the transmission and reception modules 30a-30n are provided, as individual elements, with duplexers 22a-22n, high frequency amplifiers 31a-31n, and reception mixers 32a-32n, respectively, in addition to the components of the above-mentioned transmission modules 20a-20n.

In addition, connected to the individual transmission and reception modules 30a-30n, is a reception part 7 through a signal synthesizer 6, in addition to the reference signal source 1, the signal distributor 2, and the phase control part 3B, as referred to above (FIG. 2).

The duplexers 22a-22n are inserted between the antenna elements 10a-10n and the transmission power amplifiers 13a-13n, respectively, and between the antenna elements 10a-10n and the high frequency amplifiers 31a-31n, respectively, so that they switch or select passing signals, respectively, in accordance with a transmission mode and a reception mode.

That is, the duplexers 22a-22n are to share the same antenna elements 10a-10n, respectively, in the transmission and reception modes, and for example, circulators may be used for them, respectively.

The high frequency amplifiers 31a-31n amplify the signals received by the antenna elements 10a-10n, respectively.

The reception mixers 32a-32n respectively mix reception high frequency signals S4 outputted from the high frequency amplifiers 31a-31n, respectively, and the local oscillation signals S2 outputted from the local oscillation signal generators 21a-21n, respectively, so that they generate reception intermediate frequency signals S5, respectively, by means of frequency conversion, and input the reception intermediate frequency signals S5 to the signal synthesizer 6.

In this case, the local oscillation signals S2 from the local oscillation signal generators 21a-21n are inputted to both the transmission mixers 12a-12n and the reception mixers 32a-32n, respectively.

The signal synthesizer 6 synthesizes the reception intermediate frequency signals S5 from the reception mixers 32a-32n, and inputs a synthesized signal thus obtained to the reception part 7.

As described above, in the array antenna apparatus according to the third embodiment (FIG. 5) of the present invention, the antenna elements 10a-10n having the transmission and reception modules 30a-30n, respectively, are arranged in plurality, wherein the plurality of transmission and reception modules 30a-30n have, as individual elements, the transmission signal generators 11a-11n that each output a transmission intermediate frequency signal S1, the local oscillation signal generators 21a-21n that each output a local oscillation signal S2, the transmission mixers 12a-12n that each mix the transmission intermediate frequency signal S1 and the local oscillation signal S2 with each other, thereby to carry out frequency conversion to a transmission high frequency signal S3, and the reception mixers 32a-32n that each mix the local oscillation signal S2 and the reception high frequency signal S4 with each other, thereby to carry out frequency conversion to the reception intermediate frequency signal S5.

In addition, the array antenna apparatus according to the third embodiment (FIG. 5) of the present invention is provided with the reference signal source 1 that inputs a reference signal Sr to the transmission signal generators 11a-11n and the local oscillation signal generators 21a-21n, and the signal synthesizer 6 that synthesizes the plurality of reception intermediate frequency signals S5 outputted from the individual reception mixers 32a-32n in the plurality of transmission and reception modules 30a-30n, respectively.

The transmission intermediate frequency signals S1 and the local oscillation signals S2 are synchronized with each other by the reference signal Sr.

In this manner, by making the local oscillation signals S2 used for the frequency conversion in the transmission mixers 12a-12n and the local oscillation signals S2 used for the frequency conversion in the reception mixers 32a-32n identical with each other, it is possible to cancel the influence of fluctuation in the frequency of the local oscillation signals S2 (phase noise contained in the local oscillation signals S2).

Moreover, similar to the case of the transmission signals, it is constructed such that the signal synthesizer 6 is arranged at the reception signal side, too, so as to synthesize the reception intermediate frequency signals S5 generated from n local oscillation signals S2. As a result, the SN ratio can be improved by n times in comparison with the case where a reception intermediate frequency signal generated from a single local oscillation signal is amplified by n times.

Further, by the provision of the phase control part 3B similar to the above-mentioned one (FIG. 2), the phases of the transmission high frequency signals S3 outputted from the transmission power amplifiers 13a-13n are controlled under the control of the phase control part 3B, similarly as stated above, so that it becomes possible to control the shapes and directions of the transmission beams from the antenna elements 10a-10n.

In addition, in FIG. 5, the phase control part 3B is provided for the local oscillation signal generators 21a-21n, but similar to FIG. 1, a phase control part 3A may be provided for the transmission signal generators 11a-11n, or similar to FIG. 3 (or FIG. 4), a phase and timing control part 4 (or a timing control part 5) may be provided for the transmission signal generators 11a-11n, and in any case, too, the same operational effects as those mentioned above are achieved.

Here, note that in FIG. 5, the local oscillation signals S2 generated from the same local oscillation signal generators 21a-21n are inputted to both the transmission mixers 12a-12n and the reception mixers 32a-32n, respectively, but as shown in FIG. 6, reception local transmission signal generators 23a-23n, which output reception local oscillation signals S6 to the reception mixers 32a-32n, respectively, may be provided, separately from the local oscillation signal generators 21a-21n for the transmission mixers 12a-12n.

That is, in FIG. 6, the transmission and reception modules 30a-30n of the array antenna apparatus according to the third embodiment of the present invention have, as individual elements, in addition to the transmission signal generators 11a-11n, the local oscillation signal generators 21a-21n and the transmission signal mixers 12a-12n, the local oscillation signal generators 21a-21n that each output a local oscillation signal S2, and the reception mixers 32a that each mix the local oscillation signal S2 and the reception high frequency signal S4 with each other, thereby to carry out frequency conversion to the reception intermediate frequency signal S5.

Here, note that in the above description, the output signals of the reception mixers 32a-32n are used as the reception intermediate frequency signals S5, but in the third embodiment of the present invention, the individual frequencies of the local oscillation signals S2 and the reception local oscillation signals S6 may not be the same with each other, and hence, the output signals of the reception mixers 32a-32n can also be used as reception base band signals, in place of the reception intermediate frequency signals S5.

Moreover, the array antenna apparatus according to the third embodiment (FIG. 6) of the present invention is provided with the reference signal source 1 that inputs a reference signal Sr to the transmission signal generators 11a-11n, the local oscillation signal generators 21a-21n and the reception local oscillation signal generators 23a-23n, and the signal synthesizer 6 that synthesizes the reception intermediate frequency signals S5 (or reception base band signals) outputted from the individual reception mixers 32a-32n in the transmission and reception modules 30a-30n, respectively.

According to this, the transmission intermediate frequency signals S1, the local oscillation signals S2 and the reception local oscillation signals S6 are synchronized with one another by the reference signal Sr.

In addition, the phase control signals P2 from the phase control part 3B are inputted to the local oscillation signal generators 21a-21n and the reception local oscillation signal generators 23a-23n, respectively, whereby the phases of the local oscillation signals S2 and the reception local oscillation signals S6 are controlled by the phase control signals P1, respectively.

Fourth Embodiment

Figure 7:
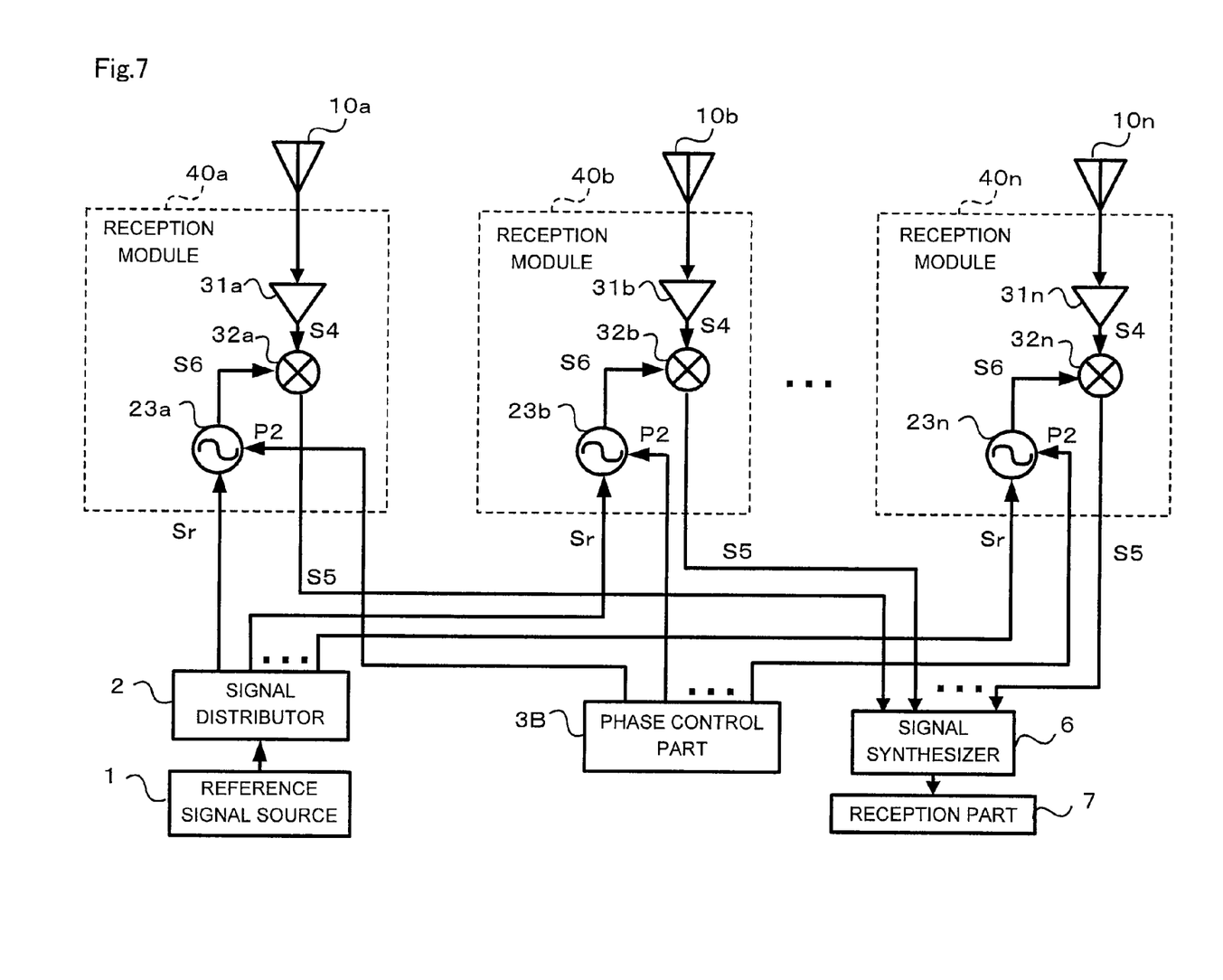
FIG. 7 is a block diagram showing a construction example of an array antenna apparatus according to a fourth embodiment of the present invention. (Fourth Embodiment)

Here, note that in the above-mentioned first and second embodiments (FIG. 1 through FIG. 4), there has been shown the case where the invention is applied only to the transmission modules 20a-20n, and in the above-mentioned third embodiment (FIG. 5 and FIG. 6), there has been showed the case where the invention is applied to the transmission and reception modules 30a-30n, but the invention may be applied only to reception modules 40a-40n (reception modules), as shown in FIG. 7.

FIG. 7 is a block diagram showing a construction example of an array antenna apparatus according to a fourth embodiment of the present invention, wherein those which are similar to the aforementioned ones (see FIG. 1 through FIG. 6) are denoted by the same reference numerals and characters as those in the aforementioned ones, while omitting a detailed explanation thereof.

In FIG. 7, the transmission and reception modules 40a-40n are respectively provided, as individual elements, with reception local oscillation signal generators 23a-23n, high frequency amplifiers 31a-31n, and reception mixers 32a-32n.

In addition, connected to the individual transmission and reception modules 40a-40n, is a reception part 7 through a signal synthesizer 6, in addition to the reference signal source 1, the signal distributor 2, and the phase control part 3B, as referred to above (FIG. 2).

The high frequency amplifiers 31a-31n amplify the signals received by the antenna elements 10a-10n, respectively.

The reception mixers 32a-32n respectively mix reception high frequency signals S4 outputted from the high frequency amplifiers 31a-31n, respectively, and the reception local oscillation signals S6 outputted from the reception local oscillation signal generators 23a-23n, respectively, so that they generate reception intermediate frequency signals S5 (or reception base band signals), respectively, by means of frequency conversion, and input the reception intermediate frequency signals S5 (or the reception base band signals) to the signal synthesizer 6.

The signal synthesizer 6 synthesizes the reception intermediate frequency signals S5 (or the reception base band signals) from the reception mixers 32a-32n, and inputs a synthesized signal thus obtained to the reception part 7.

As described above, in the array antenna apparatus according to the fourth embodiment (FIG. 7) of the present invention, the antenna elements 10a-10n having the transmission and reception modules 40a-40n, respectively, are arranged in plurality, wherein the plurality of transmission and reception modules 40a-40n have, as individual elements, the reception mixers 32a-32n that each mix the reception local oscillation signal S6 and the reception high frequency signal S4 with each other, thereby to carry out frequency conversion to the reception intermediate frequency signal or the reception base band signal S5.

Moreover, the array antenna apparatus according to the fourth embodiment (FIG. 7) of the present invention is provided with the reference signal source 1 that inputs a reference signal Sr to the reception local oscillation signal generators 23a-23n, and the signal synthesizer 6 that synthesizes the plurality of reception intermediate frequency signals or reception baseband signals S5 outputted from the individual reception mixers 32a-32n in the plurality of transmission and reception modules 40a-40n, respectively.

They are synchronized with the reception local oscillation signals S6 by the reference signals Sr.

In this manner, similar to the case of the transmission signals, it is constructed such that the signal synthesizer 6 is arranged at the reception signal side, too, so as to synthesize the reception intermediate frequency signals S5 generated from n local oscillation signals S2. As a result, the SN ratio can be improved by n times in comparison with the case where a reception intermediate frequency signal generated from a single local oscillation signal is amplified by n times.

Further, by the provision of the phase control part 3B similar to the above-mentioned one (FIG. 2), the phases of the reception intermediate frequency signals or the reception base band signal S5 outputted from the reception mixers 32a-32n are controlled under the control of the phase control part 3B, similarly as stated above, so that it becomes possible to control the shapes and directions of the reception beams from the antenna elements 10a-10n.

EXPLANATION OF REFERENCE NUMERALS AND CHARACTERS 1 reference signal source, 2 signal distributor, 3A, 3B phase control parts, 4 phase and timing control part, 5 timing control part, 6 signal synthesizer, 7 reception part, 10a-10n antenna elements, 11a-11n transmission signal generators, 12a-12n transmission mixers, 20a-20n transmission modules, 21a-21n local oscillation signal generators, 22a-22n duplexers, 23a-23n reception local oscillation signal generators, 30a-30n transmission and reception modules, 32a-32n reception mixers, 40a-40n reception modules, P1, P2 phase control signals, S1 transmission intermediate frequency signal, S2 local oscillation signal, S3 transmission high frequency signal, S4 reception high frequency signal, S5 reception intermediate frequency signal, S6 reception local oscillation signal, Sr reference signal, T timing control signal.

The invention claimed is:

1. An array antenna apparatus comprising:
a plurality of antenna elements having transmission modules, respectively;
wherein each of said plurality of transmission modules includes:
a transmission signal generator that outputs a transmission intermediate frequency signal;
a local oscillation signal generator that outputs a local oscillation signal; and
a transmission mixer that mixes said transmission intermediate frequency signal and said local oscillation signal with each other thereby to carry out frequency conversion to a transmission high frequency signal;
wherein a reference signal source is provided which inputs a reference signal to said transmission signal generators and said local oscillation signal generators; and
said transmission intermediate frequency signal and said local oscillation signal are synchronized with each other by said reference signal.

2. The array antenna apparatus as set forth in claim 1, wherein:
a phase control part is provided which outputs phase control signals to said transmission signal generators, respectively; and
the phases of said transmission intermediate frequency signals are controlled by the phase control signals, respectively.

3. The array antenna apparatus as set forth in claim 1, wherein:
a phase control part is provided which outputs phase control signals to said local oscillation signal generators, respectively; and
the phases of said local oscillation signals are controlled by the phase control signals, respectively.

4. The array antenna apparatus as set forth in claim 1, wherein:
a timing control part is provided which outputs timing control signals to said transmission signal generators, respectively; and
the signal generation timings of said transmission intermediate frequency signals are controlled by said timing control signals, respectively.

5. An array antenna apparatus comprising:
a plurality of antenna elements having transmission and reception modules, respectively;
wherein each of said plurality of transmission and reception modules includes:
a transmission signal generator that outputs a transmission intermediate frequency signal;
a local oscillation signal generator that outputs a local oscillation signal;
a transmission mixer that mixes said transmission intermediate frequency signal and said local oscillation signal with each other thereby to carry out frequency conversion to a transmission high frequency signal; and
a reception mixer that mixes said local oscillation signal and a reception high frequency signal with each other, thereby to carry out frequency conversion to a reception intermediate frequency signal;
wherein a reference signal source is provided which inputs a reference signal to said transmission signal generators and said local oscillation signal generators;
a signal synthesizer is provided which synthesizes said plurality of reception intermediate frequency signals outputted from the individual reception mixers in said plurality of transmission and reception modules, respectively; and
wherein said transmission intermediate frequency signal and said local oscillation signal are synchronized with each other by said reference signal.

6. The array antenna apparatus as set forth in claim 5, wherein:
a phase control part is provided which outputs phase control signals to said transmission signal generators, respectively; and
the phases of said transmission intermediate frequency signals are controlled by the phase control signals, respectively.

7. The array antenna apparatus as set forth in claim 5, wherein:
a phase control part is provided which outputs phase control signals to said local oscillation signal generators, respectively; and
the phases of said local oscillation signals are controlled by the phase control signals, respectively.

8. The array antenna apparatus as set forth in claim 5, wherein:
a timing control part is provided which outputs timing control signals to said transmission signal generators, respectively; and
the signal generation timings of said transmission intermediate frequency signals are controlled by said timing control signals, respectively.

9. An array antenna apparatus comprising:
a plurality of antenna elements having transmission and reception modules, respectively;

wherein each of said plurality of transmission and reception modules includes:
a transmission signal generator that outputs a transmission intermediate frequency signal;
a local oscillation signal generator that outputs a local oscillation signal;
a transmission mixer that mixes said transmission intermediate frequency signal and said local oscillation signal with each other thereby to carry out frequency conversion to a transmission high frequency signal;
a reception local oscillation signal generator that outputs a reception local oscillation signal; and
a reception mixer that mixes said reception local oscillation signal and a reception high frequency signal with each other, thereby to carry out frequency conversion to a reception intermediate frequency signal or a reception base band signal;
wherein a reference signal source is provided which inputs a reference signal to said transmission signal generators, said local oscillation signal generators and said reception local oscillation signal generators;
a signal synthesizer is provided which synthesizes said plurality of reception intermediate frequency signals or reception base band signals outputted from the individual reception mixers in said plurality of transmission and reception modules, respectively; and
wherein said transmission intermediate frequency signal, said local oscillation signal and said reception local oscillation signal are synchronized with one another by said reference signal.

10. The array antenna apparatus as set forth in claim 9, wherein:

a phase control part is provided which outputs phase control signals to said transmission signal generators, respectively; and
the phases of said transmission intermediate frequency signals are controlled by the phase control signals, respectively.

11. The array antenna apparatus as set forth in claim 9, wherein:

a phase control part is provided which outputs phase control signals to said local oscillation signal generators, respectively; and
the phases of said local oscillation signals are controlled by the phase control signals, respectively.

12. The array antenna apparatus as set forth in claim 9, wherein:

a timing control part is provided which outputs timing control signals to said transmission signal generators, respectively; and
the signal generation timings of said transmission intermediate frequency signals are controlled by said timing control signals, respectively.

13. The array antenna apparatus as set forth in claim 9, wherein:

a phase control part is provided which outputs phase control signals to said local oscillation signal generators and said reception local oscillation signal generators, respectively; and
the phases of said local oscillation signals and the reception local oscillation signals are controlled by said phase control signals, respectively.

* * * * *